United States Patent
Cabezas et al.

(10) Patent No.: US 8,370,152 B2
(45) Date of Patent: *Feb. 5, 2013

(54) METHOD, APPARATUS, AND PROGRAM FOR CERTIFYING A VOICE PROFILE WHEN TRANSMITTING TEXT MESSAGES FOR SYNTHESIZED SPEECH

(75) Inventors: Rafael Graniello Cabezas, Austin, TX (US); Jason Eric Moore, Austin, TX (US); Elizabeth Silvia, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,059

(22) Filed: Jun. 17, 2011

(65) Prior Publication Data

US 2011/0246197 A1 Oct. 6, 2011

Related U.S. Application Data

(63) Continuation of application No. 12/099,609, filed on Apr. 8, 2008, now Pat. No. 7,987,092, which is a continuation of application No. 10/347,773, filed on Jan. 17, 2003, now Pat. No. 7,379,872.

(51) Int. Cl.
*G10L 13/08* (2006.01)

(52) U.S. Cl. ...................................................... 704/260

(58) Field of Classification Search .................... 704/260
See application file for complete search history.

(56) References Cited

U.S. PATENT DOCUMENTS

| | | | |
|---|---|---|---|
| 5,530,740 A | 6/1996 | Irribarren et al. | |
| 5,651,055 A | 7/1997 | Argade | |
| 5,737,395 A | 4/1998 | Irribarren | |
| 5,825,854 A | 10/1998 | Larson et al. | |
| 5,999,595 A | 12/1999 | Shaffer et al. | |
| 6,029,195 A * | 2/2000 | Herz | 725/116 |
| 6,035,017 A | 3/2000 | Fenton et al. | |
| 6,216,104 B1 | 4/2001 | Moshfeghi et al. | |
| 6,219,638 B1 | 4/2001 | Padmanabhan et al. | |
| 6,243,445 B1 | 6/2001 | Begeja et al. | |
| 6,249,808 B1 | 6/2001 | Seshadri | |
| 6,400,806 B1 | 6/2002 | Uppaluru | |
| 6,463,412 B1 | 10/2002 | Baumgartner et al. | |
| 6,493,671 B1 * | 12/2002 | Ladd et al. | 704/270 |
| 2003/0163739 A1 | 8/2003 | Armington et al. | |
| 2005/0195076 A1 | 9/2005 | McCulloch et al. | |

* cited by examiner

*Primary Examiner* — Michael N Opsasnick
(74) *Attorney, Agent, or Firm* — Wolf, Greenfield & Sacks, P.C.

(57) ABSTRACT

A mechanism is provided for authenticating and using a personal voice profile. The voice profile may be issued by a trusted third party, such as a certification authority. The personal voice profile may include information for generating a digest or digital signature for text messages. A speech synthesis system may speak the text message using the voice characteristics, such as prosodic characteristics, only if the voice profile is authenticated and the text message is valid and free of tampering.

35 Claims, 7 Drawing Sheets

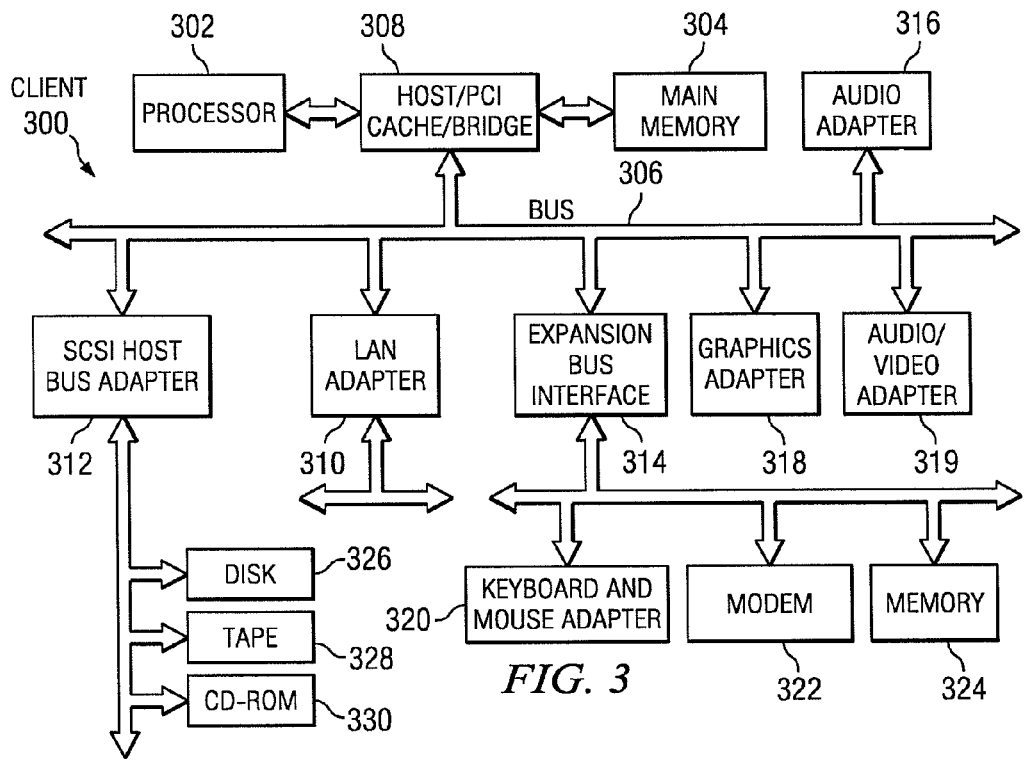
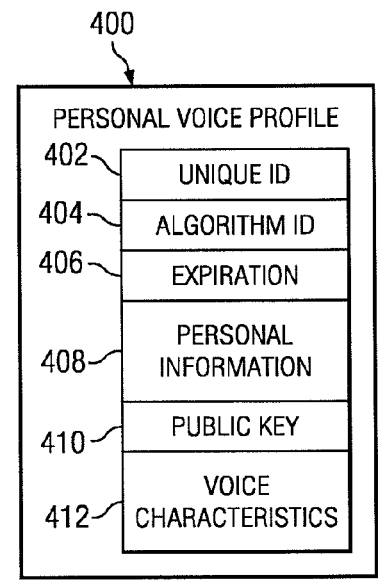
FIG. 4A

PERSONALIZED SYNTHESIZED SPEECH

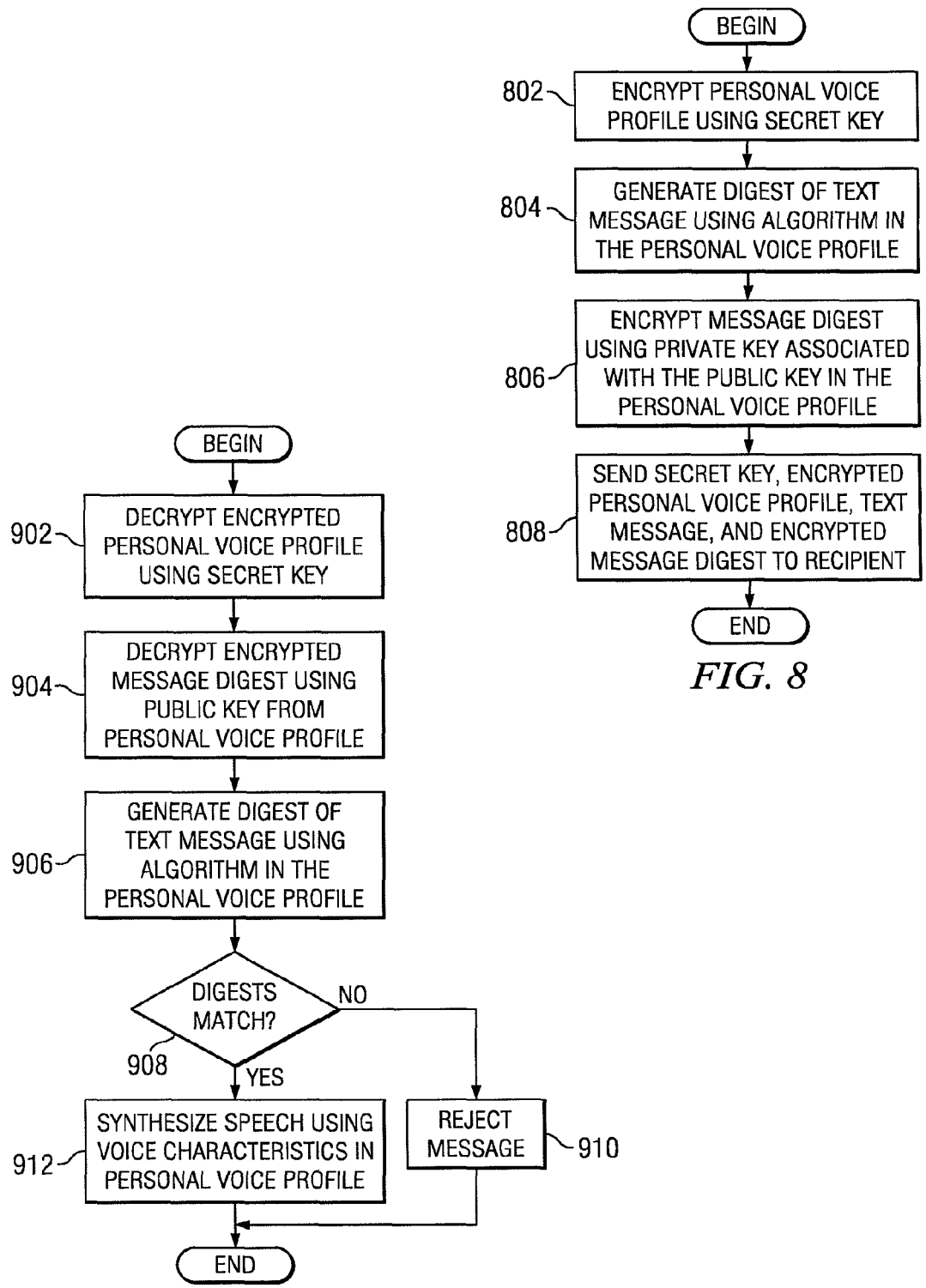

METHOD, APPARATUS, AND PROGRAM FOR CERTIFYING A VOICE PROFILE WHEN TRANSMITTING TEXT MESSAGES FOR SYNTHESIZED SPEECH

RELATED APPLICATIONS

This Application claims the benefit under 35 U.S.C. §120 and is a continuation of U.S. application Ser. No. 12/099,609, entitled "METHOD, APPARATUS, AND PROGRAM FOR CERTIFYING A VOICE PROFILE WHEN TRANSMITTING TEXT MESSAGES FOR SYNTHESIZED SPEECH" filed on Apr. 8, 2008, which claims the benefit under 35 U.S.C. §120 and is a continuation of U.S. application Ser. No. 10/347,773, entitled "METHOD, APPARATUS, AND PROGRAM FOR CERTIFYING A VOICE PROFILE WHEN TRANSMITTING TEXT MESSAGES FOR SYNTHESIZED SPEECH" filed on Jan. 17, 2003, both of which are herein incorporated by reference in their entirety.

BACKGROUND OF THE INVENTION

1. Technical Field

The present invention relates to speech synthesis and, in particular, to using prosodic information for speech synthesis. Still more particularly, the present invention provides a method, apparatus, and program for transmitting text messages for synthesized speech.

2. Description of Related Art

Speech synthesis systems convert text to speech for audible output. Speech synthesizers may use a plurality of stored speech segments and their associated representation (i.e., vocabulary) to generate speech by concatenating the stored speech segments. However, because no information is provided with the text as to how the speech should be generated, the result is typically an unnatural or robot sounding speech.

Some speech synthesis systems use prosodic information, such as pitch, duration, rhythm, intonation, stress, etc., to modify or shape the generated speech to sound more natural. In fact, voice characteristic information, such as the above prosodic information, may be used to synthesize the voice of a specific person. Thus, a person's voice may be recreated to "read" a text that the person did not actually read.

However, recreating a person's voice using voice characteristic information introduces a number of ethical issues. Once an individual's voice characteristics are extracted and stored, they may be used to speak a text the content of which the individual finds objectionable or embarrassing. When voice characteristics are transmitted for remote synthesis of speech, the person receiving the voice characteristics may not even know if the characteristics did indeed come from the appropriate individual.

Therefore, it would be advantageous to provide an improved speech synthesis system transmitting text messages and certifying voice characteristics profiles for synthesized speech.

SUMMARY OF THE INVENTION

The present invention provides a personal voice profile that includes voice characteristic information and information for certifying the profile. The voice profile may include, for example, an algorithm used for signing messages, an expiration, and a public key from a public key/private key pair. Furthermore, the personal voice profile may also include a digital signature from a trusted third party, such as a certification authority. The personal voice profile may be authenticated by verifying the digital certificate.

When the personal voice profile is transmitted, the profile may be encrypted using a secret key, such as the sender's private key, a private key from a separate public key/private key pair, the public key corresponding to the recipient's private key, or a single key that both the sending party and the receiving party know. When the owner of the personal voice profile sends a text message, the owner may generate a message digest using the algorithm identified in the personal voice profile. The message digest may then be encrypted using the private key corresponding to the public key in the personal voice profile. The digest may then be used to sign the text message.

When the message is received, the recipient may certify the message by decrypting the encrypted message digest using the public key in the personal voice profile and verifying the digest using the algorithm identified in the personal voice profile. The speech synthesis system verifies the message by generating a message digest from the text message and comparing the received message digest with the generated message digest. The speech synthesis system may reject the message if the digests do not match and synthesize the speech using the voice characteristics from the voice profile only if the message digest is authentic.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4A is block diagrams depicting a personal voice profile in accordance with a preferred embodiment of the present invention;

FIG. 8 is a flowchart illustrating the operation of a message transmission system in accordance with a preferred embodiment of the present invention; and FIG. 9 is a flowchart illustrating the operation of a speech synthesis system in accordance with a preferred embodiment of the present invention.

DETAILED DESCRIPTION OF THE PREFERRED EMBODIMENT

The present invention provides a mechanism for certifying personal voice profiles that may be transmitted over a network. An individual may transmit the voice profile and a text message to a recipient via the network. The mechanism of the present invention may authenticate a received text message before performing speech synthesis.

Figure 1:
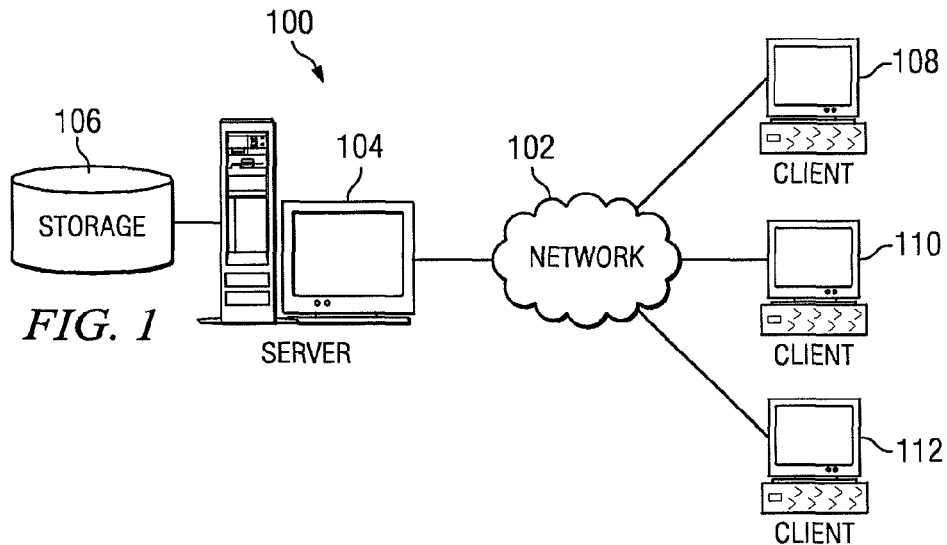
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 and provides access to storage unit 106. In addition, clients 108, 110, and 112 are connected to network 102. These clients 108, 110, and 112 may be, for example, personal computers or network computers. In the depicted example, server 104 provides data, such as electronic mail messages to clients 108-112. Clients 108, 110, and 112 are clients to server 104. Network data processing system 100 may include additional servers, clients, and other devices not shown. Messages containing voice profiles or text messages to be spoken through speech synthesis may be transmitted between clients. Message transmission may also be facilitated by a server, such as an electronic mail server.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
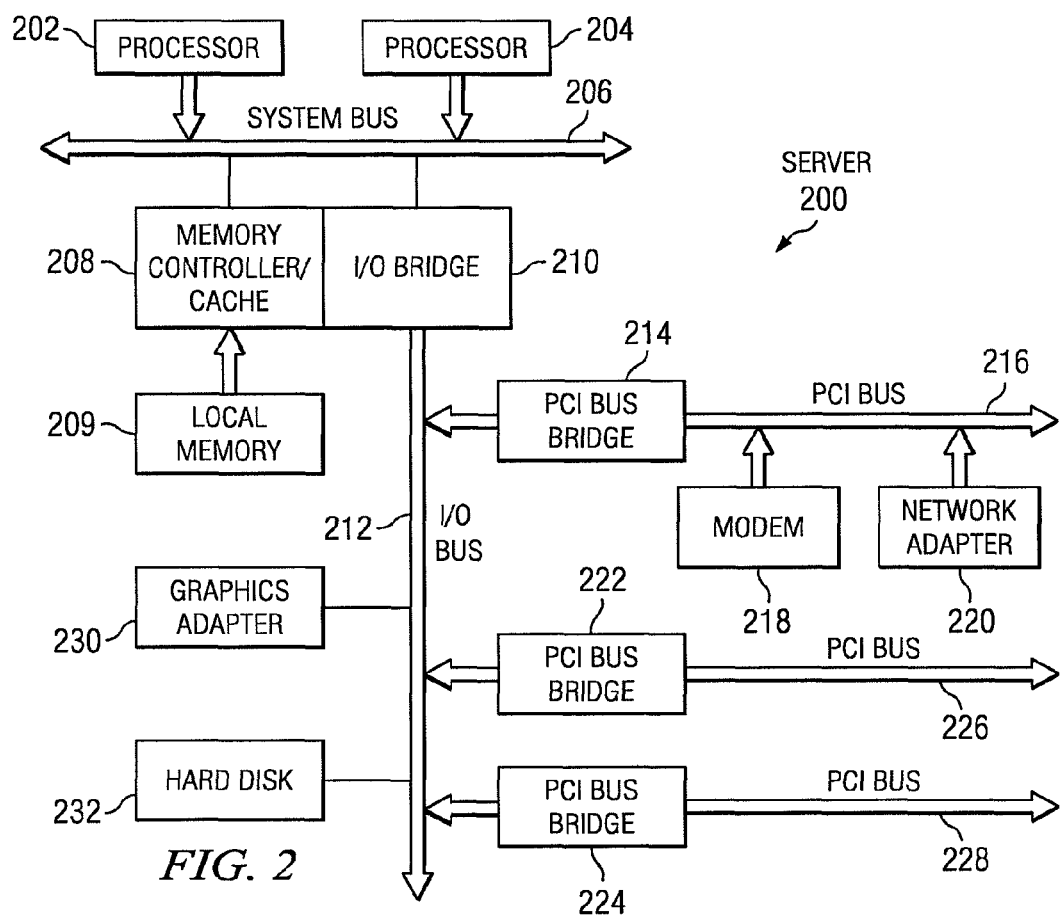
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, the present invention provides a personal voice profile, including voice characteristic information, that may be transmitted over a network to synthesize speech at a remote location. The voice characteristic information may include information such as pitch, duration, rhythm, intonation, stress, etc. These voice characteristics may be used to modify or shape the generated speech to sound more natural. In fact, voice characteristic information, such as the above prosodic information, may be used to synthesize the voice of a specific person.

For example a teacher at client 108 may send a lesson to a student at client 112. This may be advantageous if the student has a learning disability. The student may respond more favorably to the teacher than other parties that may have to read the message to the student. Thus, the teacher may send the text message, for example, when a lesson is prepared and the text message may read in the voice of the teacher using the teacher's voice characteristics at the leisure of the recipient.

As another example, many companies use electronic mail to advertise products and services. Using the personal voice profile of the present invention, a company may hire a celebrity to endorse a product or service through electronic mail. Given this technology, a celebrity or political figure may be concerned that companies will use his or her voice without permission.

Figure 4B:
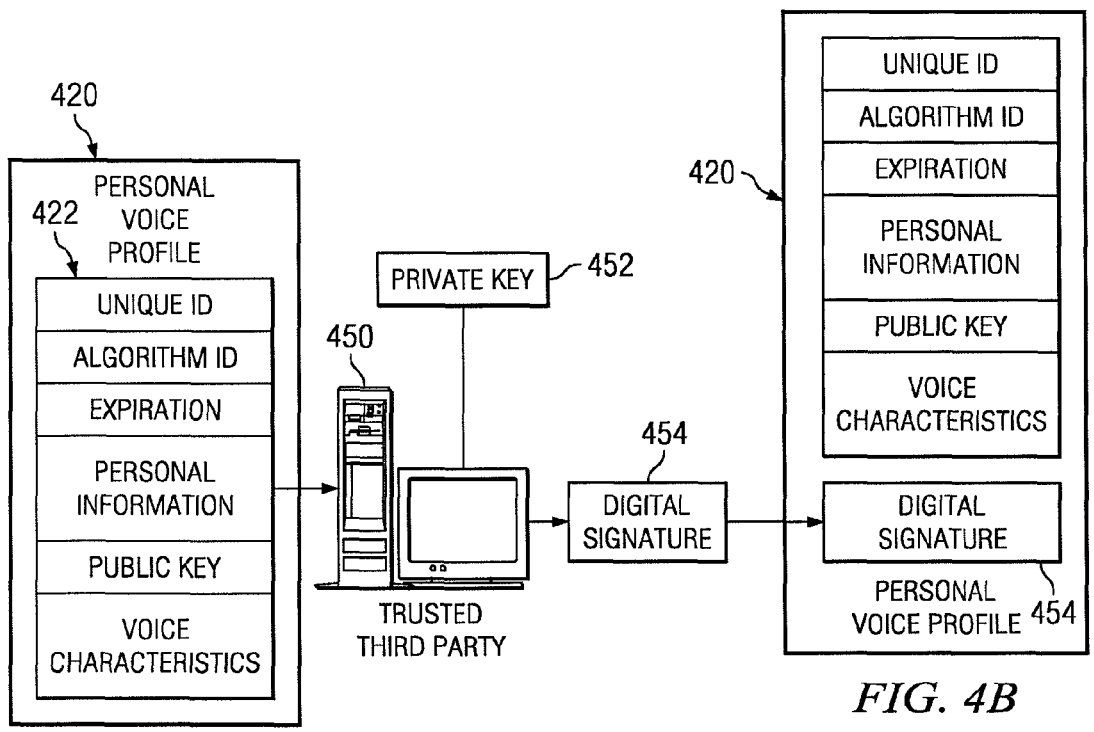
FIGS. 4B and 4C are block diagrams depicting the generation and authentication of a personal voice profile issued by a trusted third party in accordance with a preferred embodiment of the present invention.
Figure 4C:
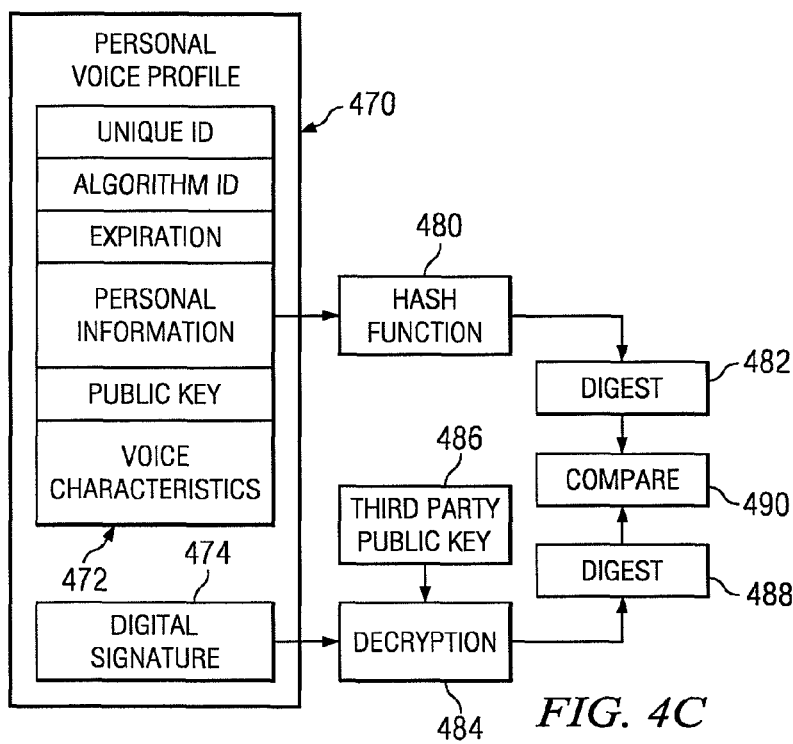

In accordance with a preferred embodiment of the present invention, the personal voice profile also includes information for certifying the profile. FIG. 4A is block diagrams depicting a personal voice profile in accordance with a preferred embodiment of the present invention. More particularly, FIGS. 4B and 4C are block diagrams depicting the generation and authentication of a personal voice profile issued by a trusted third party in accordance with a preferred embodiment of the present invention.

With specific reference now to FIG. 4A, personal voice profile 400 includes a unique identifier (ID) 402, an algorithm ID 404 used for signing messages, an expiration 406, personal information 408, a public key 410 from a public key/private key pair, and voice characteristic information 412. Personal information 408 may include, for example, name, address, date of birth, social security number, drivers license number, etc. As such, personal voice profile 400 may serve as an enhanced digital certificate.

The unique identifier may be assigned by a trusted third party that issues personal voice profiles. The trusted third party may be, for example, a certification authority (CA). The trusted third party may also issue algorithm 404, expiration 406, and public key 410. The expiration may be set to a date or a time period, such as twenty-four hours, for which the personal voice profile is valid. An expiration may allow a person to have a personal voice profile issued for a limited use.

The algorithm may be stored as an identification number. The sender may use a stored algorithm corresponding to algorithm ID 404 to generate a message digest and the recipient may use the same algorithm, again corresponding to the algorithm ID in the voice profile, to generate a message digest for comparison with the sender's message digest. Alternatively, the personal voice profile may include the actual algorithm used for generating a message digest.

The voice characteristic information may be obtained by having the individual speak a fixed text into a microphone. The voice characteristics are then extracted from this spoken dialog. Voice characteristic extraction techniques and software for voice characteristic recognition and extraction are known in the art. This process may take place at a specific location where the identity of the individual may be verified. Alternatively, the process may be performed through a network session, such as through a Web site. The network may be a secure session and the individual may be asked to provide personal information, such as drivers license number, social security number, mother's maiden name, etc., for identity verification.

With reference now to FIG. 4B, a block diagram is shown illustrating a personal voice profile issued by a trusted third party in accordance with a preferred embodiment of the present invention. Personal voice profile contains voice profile information 422, including, for example, the unique ID, algorithm ID, expiration, personal information, public key, and voice characteristic information. Trusted third party 450 generates a digest of the voice profile information 422. The digest may be, for example a message authentication code (MAC). A MAC is a number that is used to authenticate a message.

The trusted third party then encrypts the digest using the trusted third party's private key 452 to form digital signature 454. Trusted third party 450 then inserts the digital signature into personal voice profile 420 to form a certified personal voice profile.

Turning now to FIG. 4C, a block diagram illustrating the authentication of a personal voice profile is shown according to the present invention. A speech synthesis system receives certified personal voice profile 470, which includes voice profile information 472 and digital signature 474.

The speech synthesis system includes a digest generation module, such as hash function 480, which generates digest 482 using voice profile information 472. The hash function may be, for example, a MAC function; however, the hash function may be any other function that may be used to certify a personal voice profile.

The speech synthesis system also includes decryption 484, which decrypts digital signature 474 using the trusted third party's public key 486 to form digest 488. In addition, the speech synthesis system includes compare module 490 for comparing digest 482 with digest 488. If the output of compare module 490 is a match, then the personal voice profile is authenticated. However, if the output of the compare module is that the digests do not match, then it is determined that the personal voice profile is not authentic or has been tampered with.

Furthermore, a speech synthesis system may examine the expiration of the personal voice profile to determine the validity of the personal voice profile. The expiration may be a date or a time period. If the personal voice profile is expired, the speech synthesis system may reject the personal voice profile as not being valid.

The elements shown in FIG. 4C may be implemented as hardware, software, or a combination of hardware and software. In a preferred embodiment, the elements, such as hash function 480, decryption module 484, and compare module 490, are implemented as software instructions executed by one or more processors.

Figure 5A:
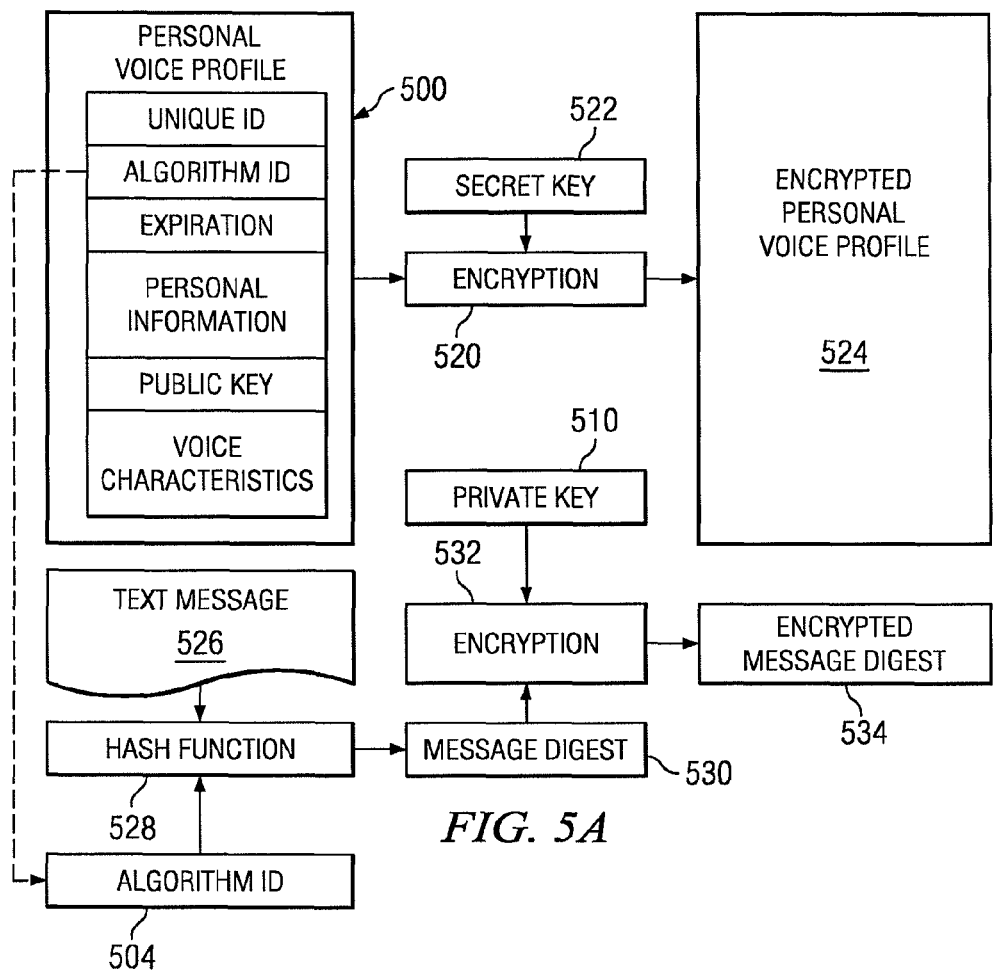
FIG. 5A is a block diagram of a message transmission system in accordance with a preferred embodiment of the present invention.

With reference to FIG. 5A, a block diagram of a message transmission system is shown in accordance with a preferred embodiment of the present invention. Personal voice profile 500 is stored for use with text messages. The message transmission system includes encryption module 520, which encrypts the personal voice profile using secret key 522 to form encrypted personal voice profile 524. The secret key may be, for example, the sender's private key, a private key from a separate public key/private key pair, the public key corresponding to the recipient's private key, or a single key that both the sending party and the receiving party know.

Text message 526 is the message to be transmitted and spoken at a remote location. The message may be plain text, HyperText Markup Language (HTML), a word processing system document, or any other textual document that may be spoken using a speech synthesis system. Preferably, text message 526 includes text specified in a speech markup language, such as Java Speech Markup Language (JSML).

The message transmission system includes hash function 528 for generating a digest of the text message. The hash function generates message digest 530 using an algorithm corresponding to algorithm ID 504 from the personal voice profile. The hash function may be, for example, a MAC function or other hashing function for generating a message digest.

Furthermore, the message transmission system includes encryption module 532 for encrypting message digest 530 using private key 510, which corresponds to the public key in the personal voice profile. Encryption module 520 and encryption module 532 may be the same module. Encryption module 532 generates encrypted message digest 534, which may serve as a digital signature for text message 526. As such, the message transmission system may insert encrypted message digest into text message 526.

As an example, the text message may be an electronic mail message from a political candidate to potential voters. It would be very important to the political candidate that the message is not modified to include damaging or embarrassing statements. The encrypted message digest ensures that the text message is not maliciously modified.

The message transmission system may further encrypt the text message with the inserted message digest using the public key of the recipient. Furthermore, the first transmission between the sender and the recipient may include the encrypted personal voice profile, the text message, and the encrypted message digest in a single transmission.

In an alternative embodiment, the personal voice profile, the text message, and the encrypted message digest may be stored on a storage medium, such as a compact disk. For example, a literary work may be read aloud in the voice of the author without requiring the time consuming and costly process of recording a reading in a sound studio. The author or other reader may also be assured that his or her voice characteristics will not be used to read other text without permission.

In a preferred embodiment of the present invention, the personal voice profile may be transmitted separately. For example, a person may purchase a textual message, such as a literary work, on a computer readable medium, e.g., a removable storage medium or carrier wave via download. This computer readable medium may include the encrypted message digest. The person may then apply a previously stored, purchased, or downloaded voice profile to read the work in a specific person's voice, such as the author.

Figure 5B:
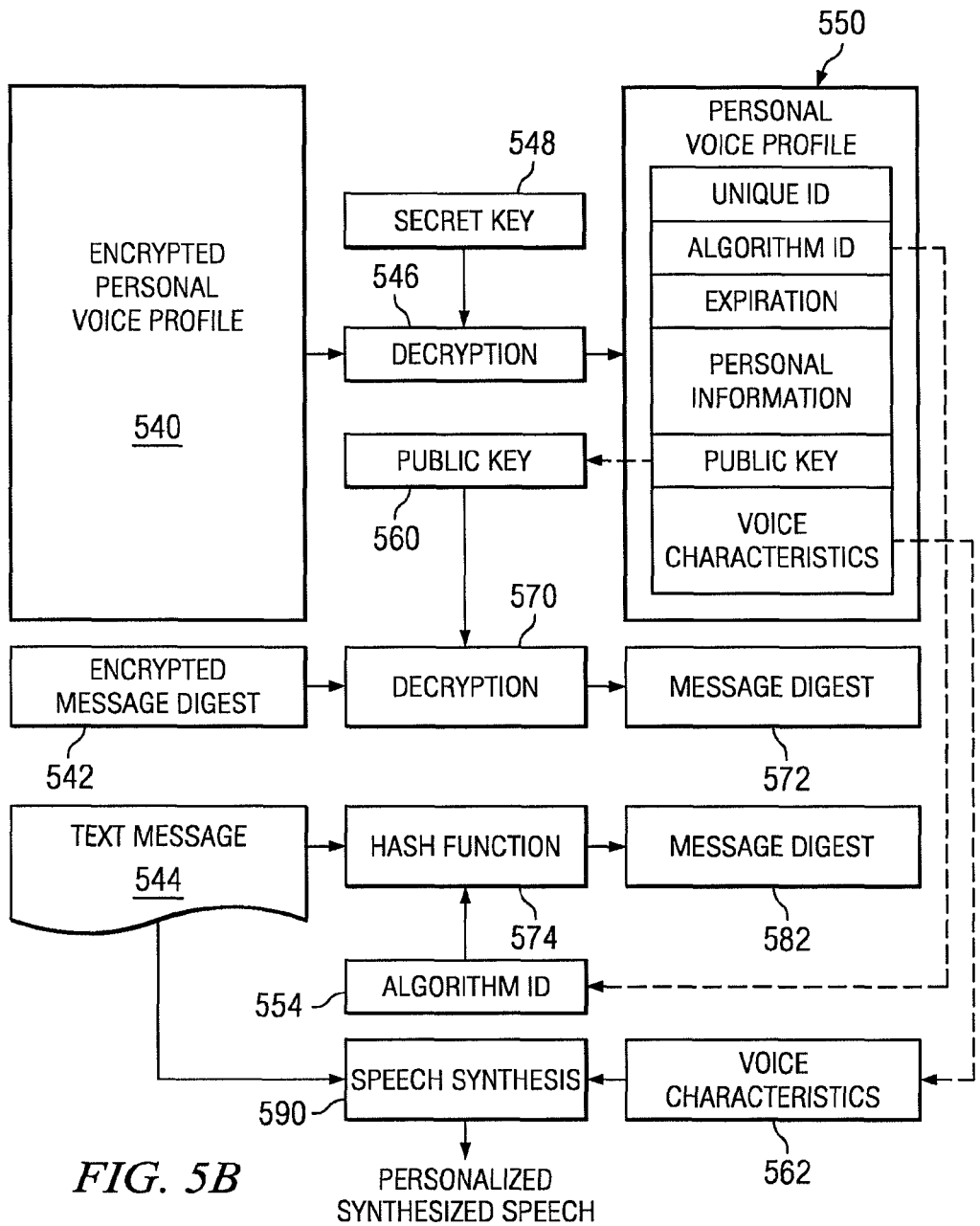
FIG. 5B is a block diagram illustrating a speech synthesis system in accordance with a preferred embodiment of the present invention.

With reference now to FIG. 5B, a block diagram illustrating a speech synthesis system is shown in accordance with a preferred embodiment of the present invention. The speech synthesis system receives encrypted personal voice profile 540, encrypted message digest 542, and text message 544. Text message 544 may be actually digitally signed using encrypted message digest 542.

As an example, the text message may be an advertisement to be read by a radio personality. If the radio personality is on vacation or otherwise unavailable, she may provide a certified personal voice profile and a digitally signed copy of the advertisement text message. The speech synthesis system can then read the advertisement on the air as if it is actually read by the radio personality.

The speech synthesis system includes decryption module 546 for decrypting the encrypted personal voice profile using secret key 548 to form personal voice profile 550. The secret key may be the sender's public key that is communicated before sending the encrypted personal voice profile, a public key from a separate public key/private key pair, the recipient's private key, or a single key that both the sending party and the receiving party know. The encrypted personal voice profile may be received only during the first transmission or when a previous personal voice profile expires.

The speech synthesis system also includes decryption module 570 for decrypting the encrypted message digest using public key 560 from personal voice profile 550. Decryption module 546 and decryption module 570 may be the same module. The output of decryption module 570 is message digest 572.

The speech synthesis system further includes hash function 574 for generating message digest 582 using an algorithm identified by algorithm ID 554 from the personal voice profile. Hash function 574 may be a MAC function. The speech synthesis system then compares message digest 572 with message digest 582. If the result of the comparison is a match, then the text message is spoken using speech synthesis 590 using voice characteristics 562 from the personal voice profile. However, if the output of the compare module is that the digests do not match, then it is determined that the text message is not intended to be read using the personal voice profile or that the text message has been tampered with.

In addition, a speech synthesis system may examine the expiration of the personal voice profile to determine the whether the personal voice profile is still valid for speech synthesis. The expiration may be a date or a time period. If the personal voice profile is expired, the speech synthesis system may reject the personal voice profile and/or the text message as not being valid.

The elements shown in FIGS. 5A and 5B may be implemented as hardware, software, or a combination of hardware and software. In a preferred embodiment, the elements, such as encryption modules 520, 532, decryption modules 546, 570, hash functions 528, 574, and speech synthesis module 590, are implemented as software instructions executed by one or more processors.

Figure 6:
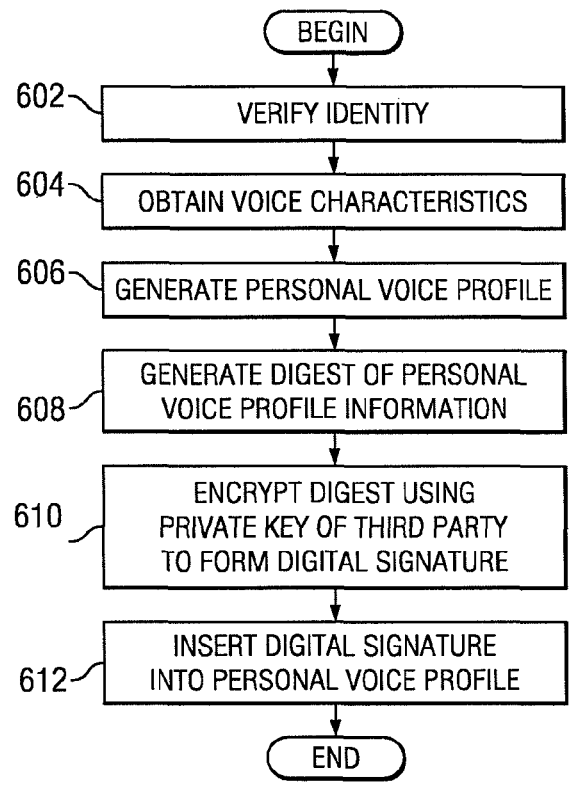
FIG. 6 is a flowchart illustrating the operation of a trusted third party issuing a personal voice profile in accordance with a preferred embodiment of the present invention.

With reference to FIG. 6, a flowchart illustrating the operation of a trusted third party issuing a personal voice profile is shown in accordance with a preferred embodiment of the present invention. The process begins and verifies the identity of an individual (step 602). Then, the process obtains voice characteristics from the individual (step 604). Voice characteristics may be obtained, for example, by having the individual speak a fixed text into a microphone and using software to recognize and extract prosodic characteristics, such as pitch, duration, rhythm, intonation, stress, etc.

Thereafter, the process generates a personal voice profile (step 606) and generates a digest of the personal voice profile information (step 608). Then, the process encrypts the digest using the private key of the trusted third party to form a digital signature (step 610). Thereafter, the process inserts the digital signature into the personal voice profile (step 612) and ends.

Figure 7:
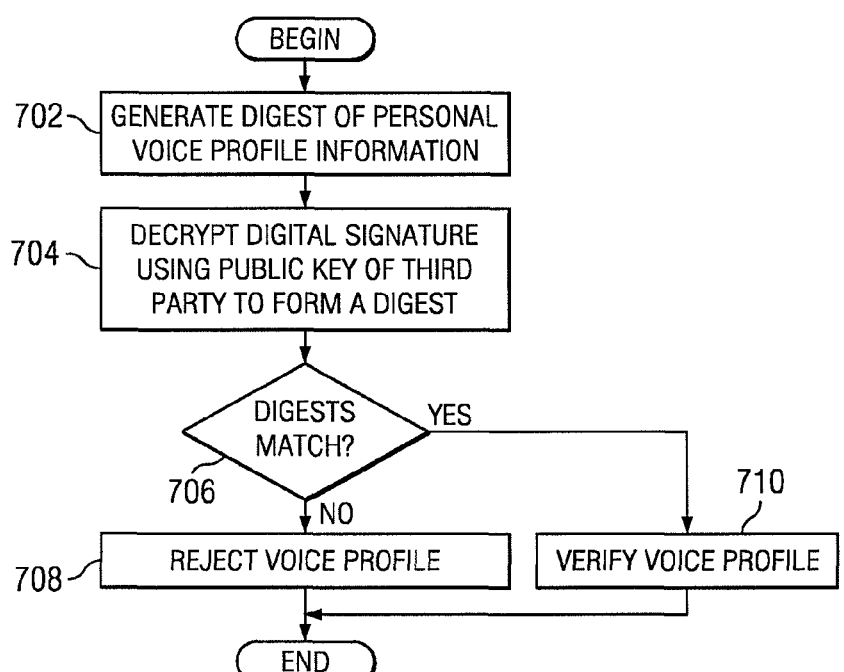
FIG. 7 is a flowchart illustrating the operation a speech synthesis system authenticating a personal voice profile in accordance with a preferred embodiment of the present invention.

Turning now to FIG. 7, a flowchart illustrating the operation a speech synthesis system authenticating a personal voice profile is shown in accordance with a preferred embodiment of the present invention. The process begins and generates a digest of the personal voice profile information (step 702). Then, the process decrypts the digital signature using the public key of the trusted third party to form a digest (step 704).

Thereafter, a determination is made as to whether the digests match (step 706). If the digests do not match, the process rejects the voice profile (step 708) and ends. If, however, the digests do match in step 706, the process verifies the voice profile (step 710) as being authentic and ends.

With reference now to FIG. 8, a flowchart illustrating the operation of a message transmission system is shown in accordance with a preferred embodiment of the present invention. The process begins and encrypts the personal voice profile using a secret key (step 802). Next, the process generates a digest of the text message using an algorithm identified in the personal voice profile (step 804). Thereafter, the process encrypts the message digest using the private key associated with the public key in the personal voice profile (step 806). Then, the process sends the secret key, encrypted personal voice profile, text message, and encrypted message digest to the recipient (step 808). Thereafter, the process ends.

During the first transmission between the sender and the recipient, the message transmission system must send the encrypted personal voice profile. However, in subsequent transmissions, the process may perform steps 804-808, sending only the text message and the encrypted message digest to the recipient in step 808.

Turning now to FIG. 9, a flowchart is shown illustrating the operation of a speech synthesis system in accordance with a preferred embodiment of the present invention. The process begins and decrypts the encrypted personal voice profile using a secret key known by the sender and the recipient (step 902). Then, the process decrypts the encrypted message digest using the public key from the personal voice profile (step 904). Next, the process generates a digest of the text message using the algorithm identified in the personal voice profile (step 906).

Thereafter, a determination is made as to whether the digests match (step 908). If the digests do not match, the process rejects the message as being modified or not approved by the owner of the voice profile (step 910). Then, the process ends. If, however, the digests do match in step 908, the process generates synthesized speech using the voice characteristics found in the personal voice profile (step 912) and ends.

Thus, the present invention solves the disadvantages of the prior art by providing a mechanism for authenticating and using a personal voice profile. The voice profile may be issued by a trusted third party, such as a certification authority. The personal voice profile may include information for generating a digest or digital signature for text messages. A speech synthesis system may speak the text message using the voice characteristics, such as prosodic characteristics, only if the voice profile is authenticated and the text message is valid and free of tampering.

Hence, a person may authorize his or her voice characteristics to be used to generate synthesized speech for a text without fear of the voice profile being abused. The person may also be assured that if the text is tampered with, the voice profile will not be used to speak the text. The personal voice profile may also include an expiration so an individual may authorize the use of his or her voice characteristics on a limited time basis.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:
1. A system comprising:
 a processor configured to execute a method comprising:
  encrypting a voice profile to form an encrypted voice profile, wherein the voice profile comprises personal prosodic voice characteristic information obtained from an individual, the personal prosodic voice characteristic information capable of being used to synthesize speech that sounds like the individual,
  generating a message digest of a text message using an algorithm for signing messages,
  encrypting the message digest using a private key associated with a public key to form an encrypted message digest, and
  outputting the text message, the encrypted voice profile, and the encrypted message digest.
2. The system of claim 1, wherein the voice profile further comprises at least one of a unique identifier, an expiration for the voice profile, and personal information regarding the individual.
3. The system of claim 1, wherein the outputting comprises one of storing the text message, the encrypted voice profile, and the encrypted message digest on a computer-readable medium and sending the text message, the encrypted voice profile, and the encrypted message digest to a recipient over a network.
4. The system of claim 1, wherein the voice profile is digitally signed by a trusted third party.

5. A system comprising:
a processor configured to execute a method comprising:
receiving a text message, an encrypted voice profile, and an encrypted message digest,
decrypting the encrypted voice profile to form a decrypted voice profile, wherein the decrypted voice profile comprises personal prosodic voice characteristic information obtained from an individual, the personal prosodic voice characteristic information capable of being used to synthesize speech that sounds like the individual,
decrypting the encrypted message digest using a public key to form a decrypted message digest,
generating a message digest of the text message using an algorithm for signing messages, and
responsive to a determination that the decrypted message digest and the message digest match, generating synthesized speech for the text message using the personal prosodic voice characteristic information.

6. The system of claim 5, wherein the receiving comprises one of retrieving the text message, the encrypted voice profile and the encrypted message digest from a computer-readable medium, and receiving the text message, the encrypted voice profile, and the encrypted message digest from a source over a network.

7. The system of claim 5, wherein the voice profile further comprises an expiration for the voice profile, and the method further comprises determining whether the voice profile is expired based on the expiration.

8. The system of claim 7, wherein the synthesized speech generated only if it is determined that the voice profile is not expired.

9. The system of claim 5, wherein the decrypted voice profile is digitally signed by a trusted third party.

10. At least one computer-readable recordable storage medium storing processor-executable instructions that, when executed by a processor, perform a method comprising:
encrypting a voice profile to form an encrypted voice profile, wherein the voice profile comprises personal prosodic voice characteristic information obtained from an individual, the personal prosodic voice characteristic information capable of being used to synthesize speech that sounds like the individual;
generating a message digest of a text message using an algorithm for signing messages;
encrypting the message digest using a private key associated with a public key to form an encrypted message digest; and
outputting the text message, the encrypted voice profile, and the encrypted message digest.

11. The at least one computer-readable recordable storage medium of claim 10, wherein the voice profile further comprises at least one of a unique identifier, an expiration for the voice profile, and personal information regarding the individual.

12. The at least one computer-readable recordable storage medium of claim 10, wherein the outputting comprises one of storing the text message, the encrypted voice profile, and the encrypted message digest on a computer-readable medium and sending the text message, the encrypted voice profile, and the encrypted message digest to a recipient over a network.

13. The at least one computer-readable recordable storage medium of claim 10, wherein the voice profile is digitally signed by a trusted third party.

14. At least one computer-readable recordable storage medium storing processor-executable instructions that, when executed by a processor, perform a method comprising:
receiving a text message, an encrypted voice profile, and an encrypted message digest;
decrypting the encrypted voice profile to form a decrypted voice profile, wherein the decrypted voice profile comprises personal prosodic voice characteristic information obtained from an individual, the personal prosodic voice characteristic information capable of being used to synthesize speech that sounds like the individual;
decrypting the encrypted message digest using a public key to form a decrypted message digest;
generating a message digest of the text message using an algorithm for signing messages; and
responsive to a determination that the decrypted message digest and the message digest match, generating synthesized speech for the text message using the personal prosodic voice characteristic information.

15. The at least one computer-readable recordable storage medium of claim 14, wherein the receiving comprises one of retrieving the text message, the encrypted voice profile and the encrypted message digest from a computer-readable medium, and receiving the text message, the encrypted voice profile and the encrypted message digest from a source over a network.

16. The at least one computer-readable recordable storage medium of claim 14, wherein the voice profile further comprises an expiration for the voice profile, and the method further comprises determining whether the voice profile is expired based on the expiration.

17. The at least one computer-readable recordable storage medium of claim 14, wherein the synthesized speech generated only if it is determined that the voice profile is not expired.

18. The at least one computer-readable recordable storage medium of claim 14, wherein the decrypted voice profile is digitally signed by a trusted third party.

19. A method comprising:
encrypting a voice profile to form an encrypted voice profile, wherein the voice profile comprises personal prosodic voice characteristic information obtained from an individual, the personal prosodic voice characteristic information capable of being used to synthesize speech that sounds like the individual;
generating a message digest of a text message using an algorithm for signing messages;
encrypting the message digest using a private key associated with a public key to form an encrypted message digest; and
outputting the text message, the encrypted voice profile, and the encrypted message digest.

20. The method of claim 19, wherein the voice profile further comprises at least one of a unique identifier, an expiration for the voice profile, and personal information regarding the individual.

21. The method of claim 19, wherein the outputting comprises one of storing the text message, the encrypted voice profile, and the encrypted message digest on a computer-readable medium and sending the text message, the encrypted voice profile, and the encrypted message digest to a recipient over a network.

22. The method of claim 19, wherein the voice profile is digitally signed by a trusted third party.

23. A method comprising:
receiving a text message, an encrypted voice profile, and an encrypted message digest;
decrypting the encrypted voice profile to form a decrypted voice profile, wherein the decrypted voice profile comprises personal prosodic voice characteristic information obtained from an individual, the personal prosodic voice characteristic information capable of being used to synthesize speech that sounds like the individual;

decrypting the encrypted message digest using a public key to form a decrypted message digest;

generating a message digest of the text message using an algorithm for signing messages; and responsive to a determination that the decrypted message digest and the message digest match, generating synthesized speech for the text message using the personal prosodic voice characteristic information.

24. The method of claim 23, wherein the receiving comprises one of retrieving the text message, the encrypted voice profile and the encrypted message digest from a computer-readable medium, and receiving the text message, the encrypted voice profile and the encrypted message digest from a source over a network.

25. The method of claim 23, wherein the voice profile further comprises an expiration for the voice profile, and the method further comprises determining whether the voice profile is expired.

26. The method of claim 25, wherein the synthesized speech generated only if it is determined that the voice profile is not expired.

27. The method of claim 23, wherein the decrypted voice profile is digitally signed by a trusted third party.

28. The system of claim 1, wherein the voice profile further comprises the public key and an identifier of the algorithm for signing messages.

29. The system of claim 5, wherein the decrypted voice profile further comprises the public key and an identifier of the algorithm for signing messages.

30. The at least one computer-readable recordable storage medium of claim 10, wherein the voice profile further comprises the public key and an identifier of the algorithm for signing messages.

31. The at least one computer-readable recordable storage medium of claim 14, wherein the decrypted voice profile further comprises the public key and an identifier of the algorithm for signing messages.

32. The method of claim 19, wherein the voice profile further comprises the public key and an identifier of the algorithm for signing messages.

33. The method of claim 23, wherein the decrypted voice profile further comprises the public key and an identifier of the algorithm for signing messages.

34. A system comprising:
a processor configured to:
encrypt a voice profile to form an encrypted voice profile, wherein the voice profile comprises personal prosodic voice characteristic information obtained from an individual, the personal prosodic voice characteristic information capable of being used to synthesize speech that sounds like the individual; and
output the encrypted voice profile.

35. A system comprising:
a processor configured to:
receive a text message, an encrypted voice profile; and
decrypt an encrypted voice profile to form a decrypted voice profile, wherein the decrypted voice profile comprises personal prosodic voice characteristic information obtained from an individual, the personal prosodic voice characteristic information capable of being used to synthesize speech that sounds like the individual.

* * * * *